United States Patent
Slayter et al.

(10) Patent No.: US 9,879,773 B2
(45) Date of Patent: Jan. 30, 2018

(54) GEAR SHROUD TO PASSIVELY LUBRICATE GEARBOX COMPONENT

(71) Applicant: Hamilton Sundstrand Corporation, Charlotte, NC (US)

(72) Inventors: Matthew Allen Slayter, Rockford, IL (US); Michael R. Blewett, Stillman Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/721,267

(22) Filed: May 26, 2015

(65) Prior Publication Data
US 2016/0348781 A1 Dec. 1, 2016

(51) Int. Cl.
*F16H 21/00* (2006.01)
*F16H 57/04* (2010.01)
*F16H 1/06* (2006.01)

(52) U.S. Cl.
CPC .......... *F16H 57/0423* (2013.01); *F16H 1/06* (2013.01); *F16H 57/0471* (2013.01)

(58) Field of Classification Search
CPC ..... F16H 57/0423; F16H 1/06; F16H 57/0471
See application file for complete search history.

(56) References Cited

U.S. PATENT DOCUMENTS

| | | | |
|---|---|---|---|
| 3,785,458 A | 1/1974 | Caldwell et al. | |
| 5,887,678 A * | 3/1999 | Lavender | F01M 9/06 123/196 R |
| 6,374,951 B1 * | 4/2002 | Michelhaugh | F16C 33/1085 184/7.4 |
| 7,568,575 B2 | 8/2009 | Kalantari | |
| 2009/0176614 A1 * | 7/2009 | Hilker | F16H 57/0427 475/160 |
| 2013/0025405 A1 * | 1/2013 | Arisawa | F01D 25/18 74/606 R |
| 2013/0180803 A1 * | 7/2013 | Tanaka | F16H 57/0409 184/6.12 |
| 2014/0260790 A1 * | 9/2014 | Passino | F16H 57/0409 74/606 R |

FOREIGN PATENT DOCUMENTS

| | | |
|---|---|---|
| DE | 1030123 B | 5/1958 |
| DE | 10032510 A1 | 2/2001 |
| DE | 102006045238 A1 | 4/2008 |
| GB | 1426352 A | 2/1976 |
| JP | 59-140962 | 8/1984 |

OTHER PUBLICATIONS

European Search Report for European Application No. 16171115.5 dated Dec. 23, 2016.

* cited by examiner

*Primary Examiner* — Zakaria Elahmadi
(74) *Attorney, Agent, or Firm* — Carlson, Gaskey & Olds, PC

(57) ABSTRACT

A gearbox includes at least two engaged gears, with at least one of the two gears provided with a shroud positioned radially outwardly of the one gear. The shroud extends between circumferential ends which do not fully surround the one gear. An extension extends from the shroud to a component to be lubricated. A shroud is also disclosed.

15 Claims, 4 Drawing Sheets

GEAR SHROUD TO PASSIVELY LUBRICATE GEARBOX COMPONENT

BACKGROUND OF THE INVENTION

This application relates to a gear shroud which partially surrounds a gear in a gearbox, and which directs lubricant to other components.

Gearboxes are known, and include a number of interengaging gears. Typically, a drive input drives one gear, and that gear engages a second driven gear. Any number of applications of gearboxes are known.

Gears in various components within the gearbox require lubrication. Further, there may be areas within the gearbox where it is desirable to limit air or oil flow. As an example, there are "quiet" areas that would desirably have little disturbance.

A shroud is often placed around a portion of a circumference of a gear to take on a windage from the gear and direct it away from the "quiet areas."

SUMMARY OF THE INVENTION

A gearbox includes at least two engaged gears, with at least one of the two gears provided with a shroud positioned radially outwardly of the one gear. The shroud extends between circumferential ends which do not fully surround the one gear. An extension extends from the shroud to a component to be lubricated. A shroud is also disclosed.

These and other features can be best understood from the following specification and drawings, the following of which is a brief description.

BRIEF DESCRIPTION OF THE DRAWINGS

These and other features of this application may be best understood from the following specification and drawings, the following which is a brief description.

DETAILED DESCRIPTION

Figure 1:
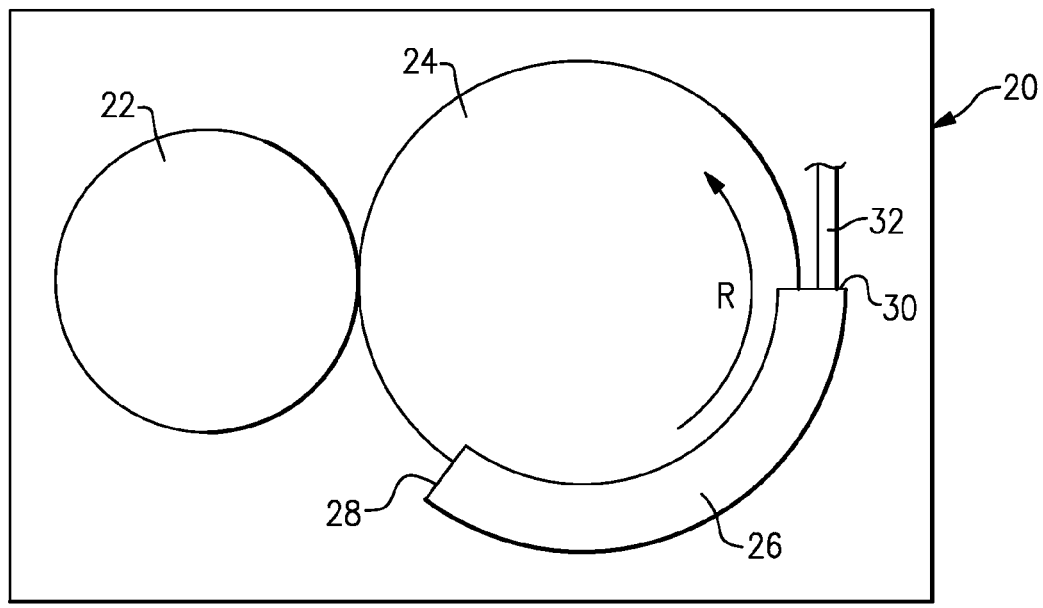
FIG. 1 schematically shows a gearbox.

A gearbox 20 is illustrated in FIG. 1 and has two interengaging gears 22 and 24. The FIG. 1 view is highly schematic, and details of applications for gearboxes are known to a worker of ordinary skill in this art.

A shroud extends between circumferential ends 28 and 30 but does not fully surround the gear 24. Typically, the shroud is designed to take on a pressure head from the gear and limit flow of fluids to areas which are desirably "quiet." As an example, the area radially outwardly of the shroud 26 relative to the gear 24 may be such a quiet area.

An extension 32 of the shroud 26 extends in a direction of rotation R of the gear 24. The extension 32 will deliver lubricant to components that desirably receive lubrication.

Figure 2:
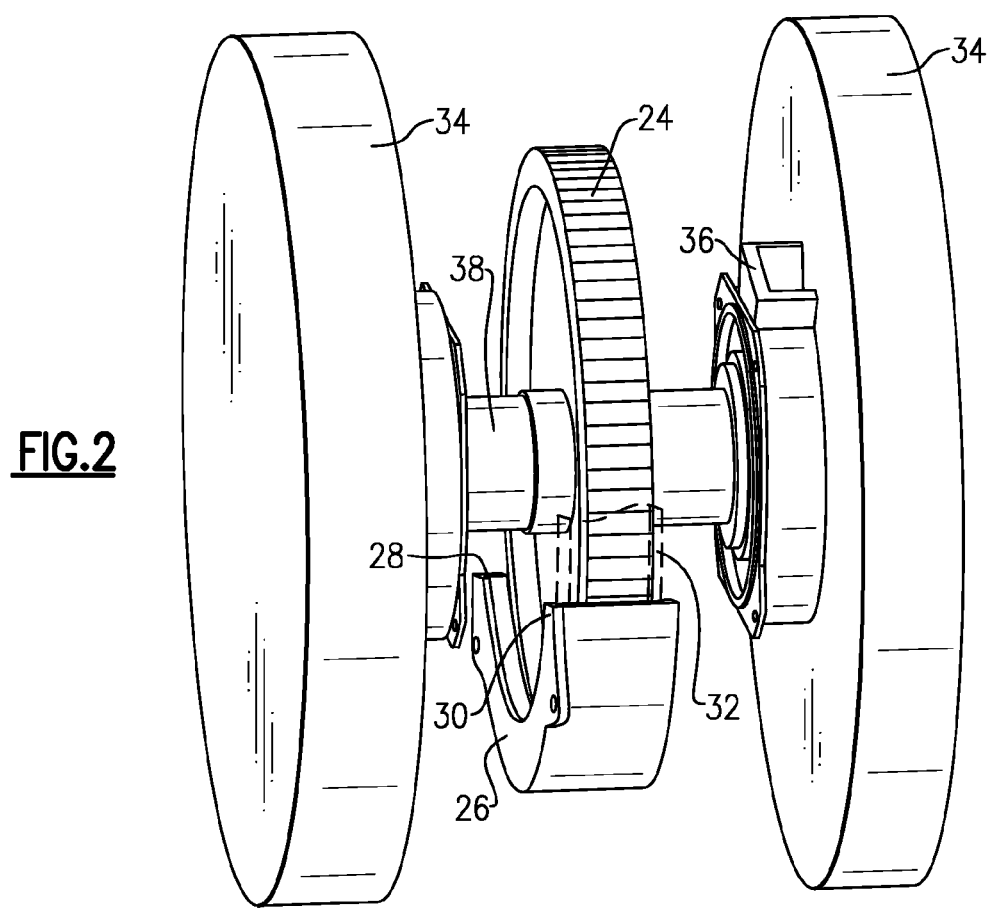
FIG. 2 shows a portion of the gearbox.

FIG. 2 shows the gear 24 being mounted in housing walls 34. An oil scupper 36 is mounted on one of the housing walls 34. A shaft 38 rotates with gear 24.

Figure 3:
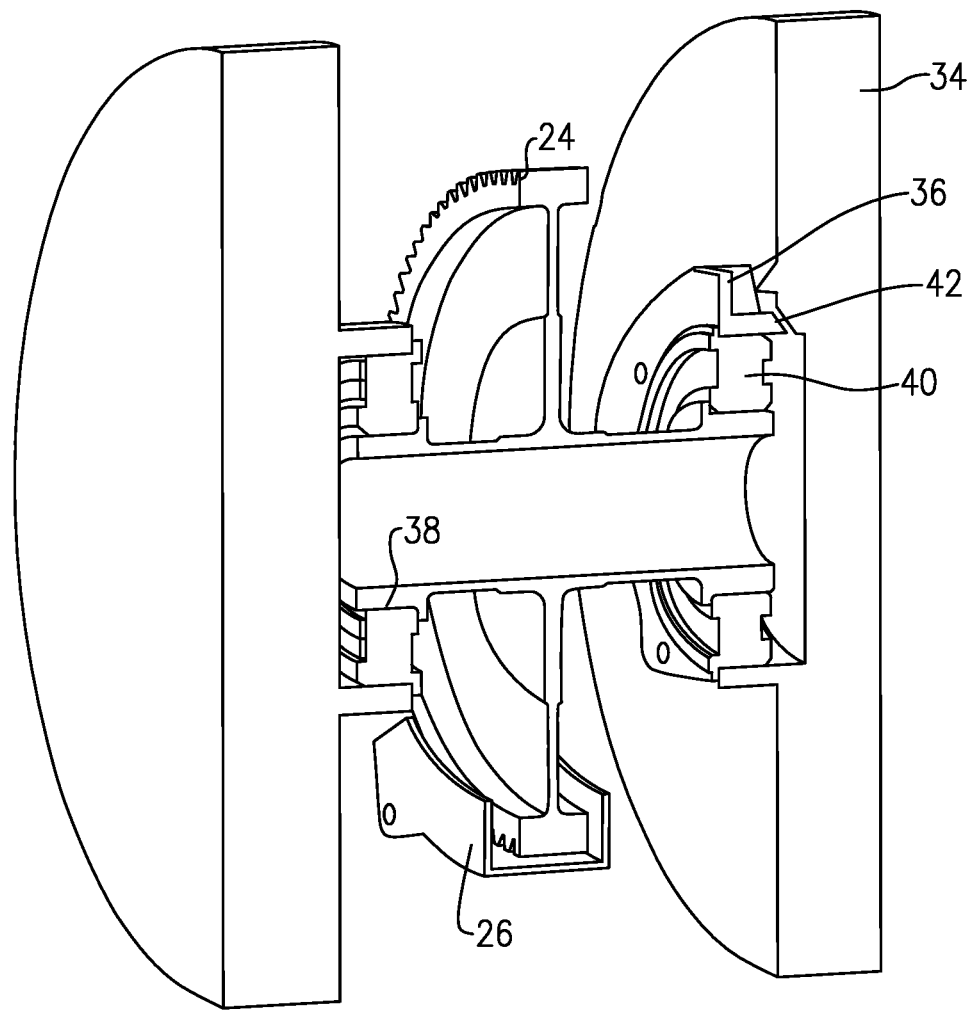
FIG. 3 shows another view of the FIG. 2 portion.

FIG. 3 shows details of the scupper 36. As shown, a passage 42 allows lubricant from the scupper 36 to flow radially inwardly to lubricate bearing 40. Bearing 40 supports shaft 38.

Figure 4A:
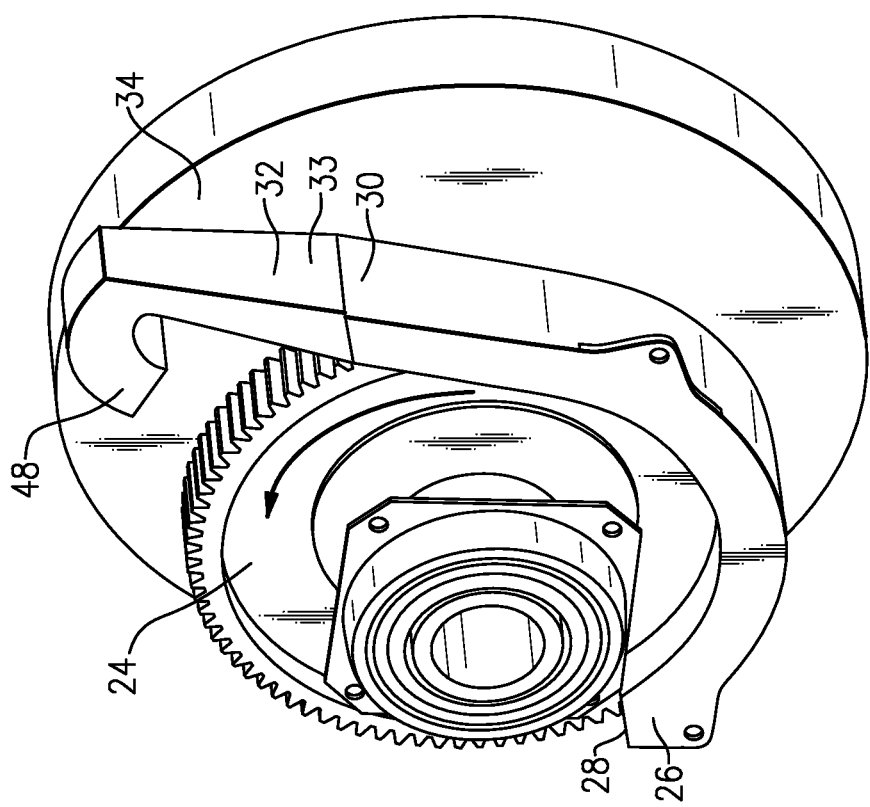
FIG. 4A shows a first embodiment.

FIG. 4A shows a first embodiment of the extension 32. As shown, the extension 32 has sidewalls 44, and an outer wall 46. Oil is driven upwardly into the extension 32, which acts as a "water slide" to deliver the lubricant to an outlet 48 positioned radially outwardly of scupper 36.

Figure 4B:
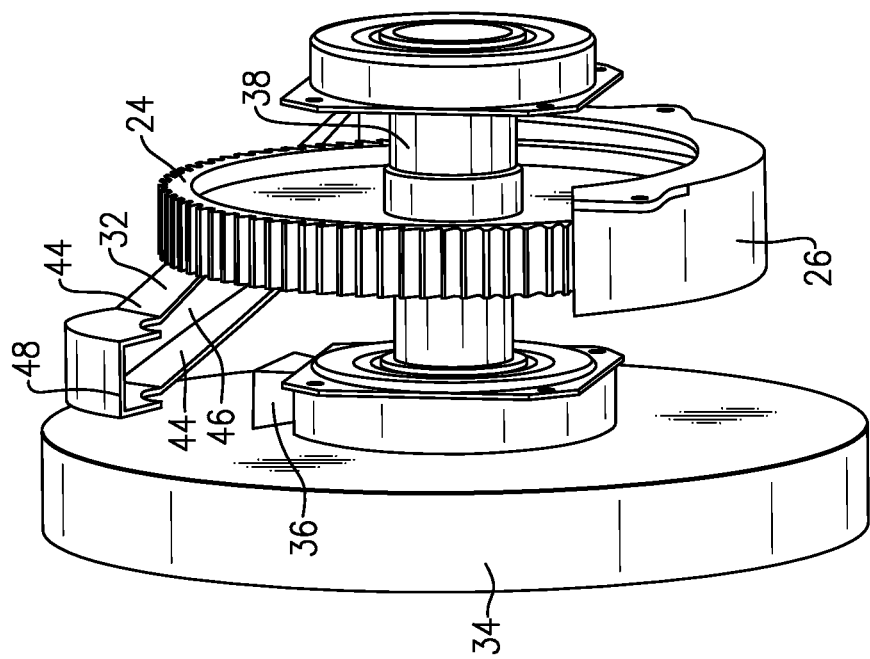
FIG. 4B is a second view of the first embodiment.

FIG. 4B is an opposed view of the extension 32 and shows a circumferential end 33 of the shroud 26 merging into the extension 32.

As can be appreciated, as the gear 24 is rotating, it will drive lubricant upwardly through the shroud 26, into the extension 32, and then into the scupper 36.

Thus, a distinct lubricant passage is provided without the requirement of a separate supply system.

While a separate extension is shown, the extension can also be integrated into the shroud casting. Also, the shroud 26 and the extension 32 can be integrated into a housing wall 34, or other static component.

As can be appreciated between FIGS. 4A and 4B, an inlet end 33 to the extension 32 begins within an axial width of the gear 24, while the outlet 48 is spaced away from the gear. Thus, the extension 32 extends axially away from an axial width of the gear 24 (and the shroud) such that the outlet 48 is beyond the axial width of gear 24.

Figure 5:
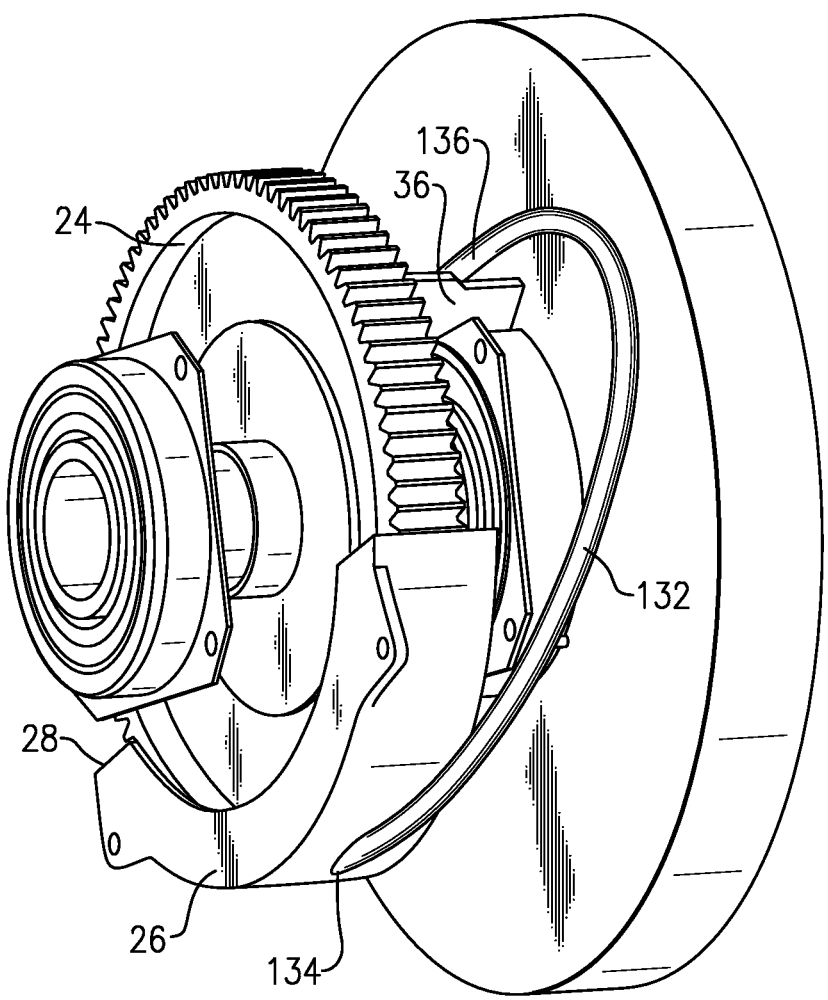
FIG. 5 is a second embodiment.

FIG. 5 shows another embodiment wherein the extension is an enclosed tube 132 that begins with an inlet end 134 which is at a circumferentially intermediate location in the shroud 26. An outlet 136 of the tube 132 is positioned radially outwardly of scupper 36. Here too, the inlet end 134 is within an axial width of the gear 24, while the outlet 136 is spaced away from the gear. Thus, the extension 132 extends axially away from an axial width of the gear (and the shroud) such that outlet 136 is beyond the axial width of gear 24.

While the tube 132 may be a separate component, such as a tube brazed to the shroud, the tube could also be integrated into the casting of the shroud 26.

Figure 6:
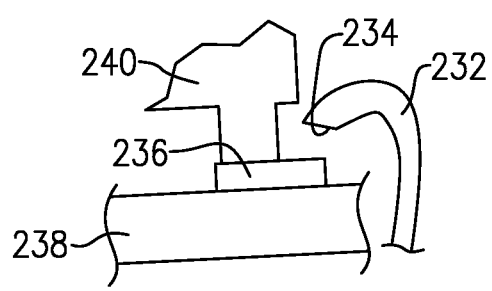
FIG. 6 is a third embodiment.

FIG. 6 shows another embodiment extension 232 having an outlet 234. A gear 240 is driven by a shaft 238 through a spline connection 236. The outlet 234 is positioned to lubricate the spline 236.

Of course, other components may be lubricated within the basic teachings of this disclosure.

While embodiments have been disclosed, a worker of ordinary skill in this art would recognize that certain modifications would come within the scope of this invention. Thus, the following claims should be studied to determine the true scope and content of this invention.

The invention claimed is:
1. A gearbox including:
   at least two engaged gears, with one of said at least two gears being provided with a shroud positioned radially outwardly of said one of said at least two gears, with said shroud extending between circumferential ends which do not fully surround said one of said at least two gears, and an extension extending from said shroud to a component to be lubricated; and
   wherein an inlet into said extension is within an axial width of said one of said at least two gears and said extension extending away from the axial width of said one of said at least two gears so that an outlet of said extension is spaced outwardly of the axial width of the gear, such that when said at least one gear rotates, lubricant is driven through said shroud and into said inlet of said extension, and then to said outlet of said extension, said shroud being designed to take on a pressure head from said one of said at least two gears, and limit flow of fluid to an area radially outwardly of said shroud relative to said one of said at least two gears.

2. The gearbox as set forth in claim 1, wherein said component to be lubricated is a bearing.

3. The gearbox as set forth in claim 2, wherein said bearing supports a shaft rotating with said one of said at least two gears.

4. The gearbox as set forth in claim 3, wherein said extension delivers oil into an oil scupper for delivering oil to said bearing.

5. The gearbox as set forth in claim 2, wherein said extension delivers oil into an oil scupper for delivering oil to said bearing.

6. The gearbox as set forth in claim 1, wherein said component to be lubricated is a portion of a shaft.

7. The gearbox as set forth in claim 6, wherein said portion of said shaft is a spline.

8. The gearbox as set forth in claim 1, wherein said extension having sidewalls and a radially outer wall, and said extension extending from one of said circumferential ends of said shroud.

9. The gearbox as set forth in claim 8, wherein said extension delivering oil from said one of said circumferential ends of said shroud into a scupper.

10. The gearbox as set forth in claim 9, wherein said scupper delivering oil to a bearing.

11. The gearbox as set forth in claim 1, wherein said inlet to said extension is at a circumferentially intermediate location in said shroud.

12. The gearbox as set forth in claim 11, wherein said extension is an enclosed tube.

13. The gearbox as set forth in claim 1, wherein said extension is an enclosed tube.

14. The gearbox as set forth in claim 1, wherein said extension is integrated into a casting of said shroud.

15. The gearbox as set forth in claim 1, wherein said extension is formed as a part separate from said shroud.

* * * * *